United States Patent
Ueno

(10) Patent No.: US 7,478,533 B2
(45) Date of Patent: Jan. 20, 2009

(54) ENGINE SYSTEM WITH A SUPERCHARGER

(75) Inventor: Masaki Ueno, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 99 days.

(21) Appl. No.: 11/496,719

(22) Filed: Aug. 1, 2006

(65) Prior Publication Data

US 2007/0033938 A1 Feb. 15, 2007

(30) Foreign Application Priority Data

Aug. 3, 2005 (JP) ............................. 2005-225035

(51) Int. Cl.
*F02B 33/44* (2006.01)
*F02B 37/14* (2006.01)
*F02D 23/00* (2006.01)

(52) U.S. Cl. ............................. 60/608; 60/602; 290/52
(58) Field of Classification Search .................. 60/602, 60/607–609; 290/52; *F02B 37/14*
See application file for complete search history.

(56) References Cited

U.S. PATENT DOCUMENTS

| 5,678,407 | A * | 10/1997 | Hara ............................. 60/608 |
| 6,705,084 | B2 * | 3/2004 | Allen et al. ..................... 60/608 |
| 7,174,714 | B2 * | 2/2007 | Algrain ......................... 60/608 |
| 7,237,381 | B2 * | 7/2007 | Kolavennu et al. ............ 60/608 |
| 2006/0196183 | A1 * | 9/2006 | Isogai ........................... 60/607 |
| 2006/0260305 | A1 * | 11/2006 | Ishiwatari ...................... 60/599 |
| 2007/0051349 | A1 * | 3/2007 | Marumoto et al. ....... 123/559.1 |
| 2008/0053091 | A1 * | 3/2008 | Barthelet ...................... 60/608 |

FOREIGN PATENT DOCUMENTS

| EP | 709559 A1 * | 5/1996 |
| EP | 1336737 A2 * | 8/2003 |
| JP | 08-182382 A | 7/1996 |
| JP | 2003/239755 A | 8/2003 |
| WO | WO 2006087014 A1 * | 8/2006 |

* cited by examiner

*Primary Examiner*—Thai-Ba Trieu
(74) *Attorney, Agent, or Firm*—Arent Fox LLP

(57) ABSTRACT

An engine system includes a compressor system which is at least partially driven by an electric motor, and a turbine system. The system includes a detector for detecting an actual supercharging pressure. A target supercharging pressure is determined based on operational conditions of the engine. A first control demand value is calculated to drive the motor controller, such that the actual supercharging pressure approaches the target supercharging pressure. A target value of the first control demand value is determined based on the operational conditions of the engine. A second control demand value, a difference between the target value and the first control command value is applied to the turbine system to adjust the rotation of the turbine such that the first control demand value converges to the target value.

24 Claims, 12 Drawing Sheets

(a)

(b)

ENGINE SYSTEM WITH A SUPERCHARGER

BACKGROUND OF THE INVENTION

The present invention relates to a supercharging pressure control with a turbocharger of an internal combustion engine, and in particular, it relates to a supercharging pressure control with a turbocharger having an electric motor for adjusting the supercharging pressure.

The turbocharger is a device for enhancing performance of the engine by compressing the intake air with the use of exhaust gas of the engine. A basic structure of the turbocharger includes a turbine and a compressor provided to opposing ends of a rotary shaft. The compressor is positioned on the air intake side and the turbine is positioned on the exhaust side. The turbine is rotated by the exhaust gas flow to drive the compressor. The intake air is compressed by the rotating compressor. The turbocharger provides a high efficiency by using the energy of exhaust gas, which otherwise is useless. For this reason, the turbocharger has been conventionally used. However, there have been some problems with regard to the turbocharger. For example, when the engine speed is low, the efficiency is low because the exhaust gas flow is low. When the engine rotational speed rises high enough to produce high efficiency, there is a time delay before high efficiency is produced.

One approach for supplementing shortage of output power of the supercharger is discussed in the Japanese Patent Publication No. 8-182382. A turbocharger is described having an electric motor incorporated into the turbocharger to drive a turbine forcibly so as to produce a target supercharging pressure. Electricity supply to the motor is controlled in accordance with the difference between an actual supercharging pressure and a target supercharging pressure obtained by searching a table based on operating conditions.

Japanese Patent Application Publication No. 2003-239755 discloses a supercharging pressure control apparatus in which a supercharging pressure control is additionally provided by another controller than a control by using an electric motor. In this apparatus, control is performed to reduce consumption of electricity. According to this technique, an output characteristic and/or a fuel cost can be also improved because the supercharging pressure can be controlled without interference among multiple controls for the electric motor and other control components.

However, the apparatus of the Japanese Patent Application Publication No. 8-182382 takes into consideration only the electric motor as means for controlling the supercharging pressure. Therefore, when multiple controllers are provided, various supercharging pressure controls by individual controller may interfere with each other.

The apparatus disclosed in the Japanese Patent Application Publication No. 2003-239755 is not necessarily directed to a scheme which does not use an electric motor. According to the disclosed control technique, the electric motor is always used while the actual supercharging pressure is smaller than a target supercharging pressure. Therefore, consumption of electricity would be high. Even if a predetermined threshold value for suspending the use of the electric motor is established, adjustment in a trial-and-error manner is required in advance. Moreover, since many setup maps including, for example, a map doe supercharging pressure adjustment values for the electric motor (that is, a target value map) are additionally required, increasing man-hours for set-up.

Thus, there is a need for an engine with a supercharger wherein multiple supercharging pressure control devices can be adjusted using a relatively small number of parameters while avoiding interferences among the multiple control devices.

SUMMARY OF THE INVENTION

An engine system with a supercharger of the present invention includes a compressor system provided in an intake pipe for producing a supercharging pressure. The compressor system is at least partially powered by an electric motor under the control of a motor controller. The engine system also includes a turbine system provided in an exhaust pipe and connected to the compressor system for driving the compressor system. The engine system further includes a detector for detecting an actual supercharging pressure, and means for determining a target supercharging pressure based on operational conditions of the engine. The engine system also includes means for calculating a first control demand value to be provided to the motor controller for driving the compressor system so that the actual supercharging pressure detected by the detector converges to the target supercharging pressure. The engine system further includes means for determining a target value of the first control demand value based on the operational conditions of the engine. The engine further includes means for calculating a second control demand value to be provided to the turbine system for driving the compressor system such that the first control demand value converges to the target value.

According to one aspect of the present invention, in a normal operation, the target value is set to zero. Thus, turbine system drives the compressor system so that the first control demand value converges to zero. Typically, the first control demand value is the difference between the target supercharging pressure and the actual supercharging pressure detected by the detector.

According to the present invention, an initial supercharging control is carried out preferentially by the electric motor when the supercharging control begins. As the first control demand value approaches the target value, control is primarily carried out by the turbine system. This way, distribution of operations to individual devices is adjusted while preventing interferences among multiple devices. Since usage of the electric motor requiring a relatively large power consumption is gradually reduced, the energy consumption of the apparatus is decreased.

According to another aspect of the present invention, during an accelerating operation, the target value is set to a predetermined value. The turbine system controls the supercharging pressure such that the first control demand value converges to the predetermined value.

According to another aspect of the present invention, the engine system further includes a battery for driving the electric motor. When the battery charge is lower than a predetermined value, the control by the first supercharging pressure controller is stopped.

According to yet further aspect of the present invention, the engine system is provided with a throttle valve in the intake pipe between an engine block and the compressor system. When the actual supercharging pressure is lower than the target supercharging pressure, the control input to the motor controller is increased in proportion to a magnitude of the difference between the actual supercharging pressure and the target supercharging pressure so that the actual supercharging pressure rises. When the actual supercharging pressure is higher than the target supercharging pressure, the opening angle of the throttle valve is moved toward a closing direction in proportion to the magnitude of the difference to suppress supercharging.

According to yet further aspect of the present invention, when the actual supercharging pressure is lower than the target supercharging pressure, the control input to the motor controller is increased in proportion to the magnitude of difference between the actual supercharging pressure and the target supercharging pressure and the opening angle of the throttle valve is moved substantially to a full open angle to enhance supercharging. When the actual supercharging pressure is higher than the target supercharging pressure, the opening angle of the throttle valve is moved toward a closing direction in proportion to the magnitude of the difference and the control input to the motor controller is set to a predetermined minimum value so that the actual supercharging pressure falls.

DESCRIPTION OF THE PREFERRED EMBODIMENTS

Some embodiments in accordance with the present invention will now be described with reference to the accompanying drawings.

Figure 1:
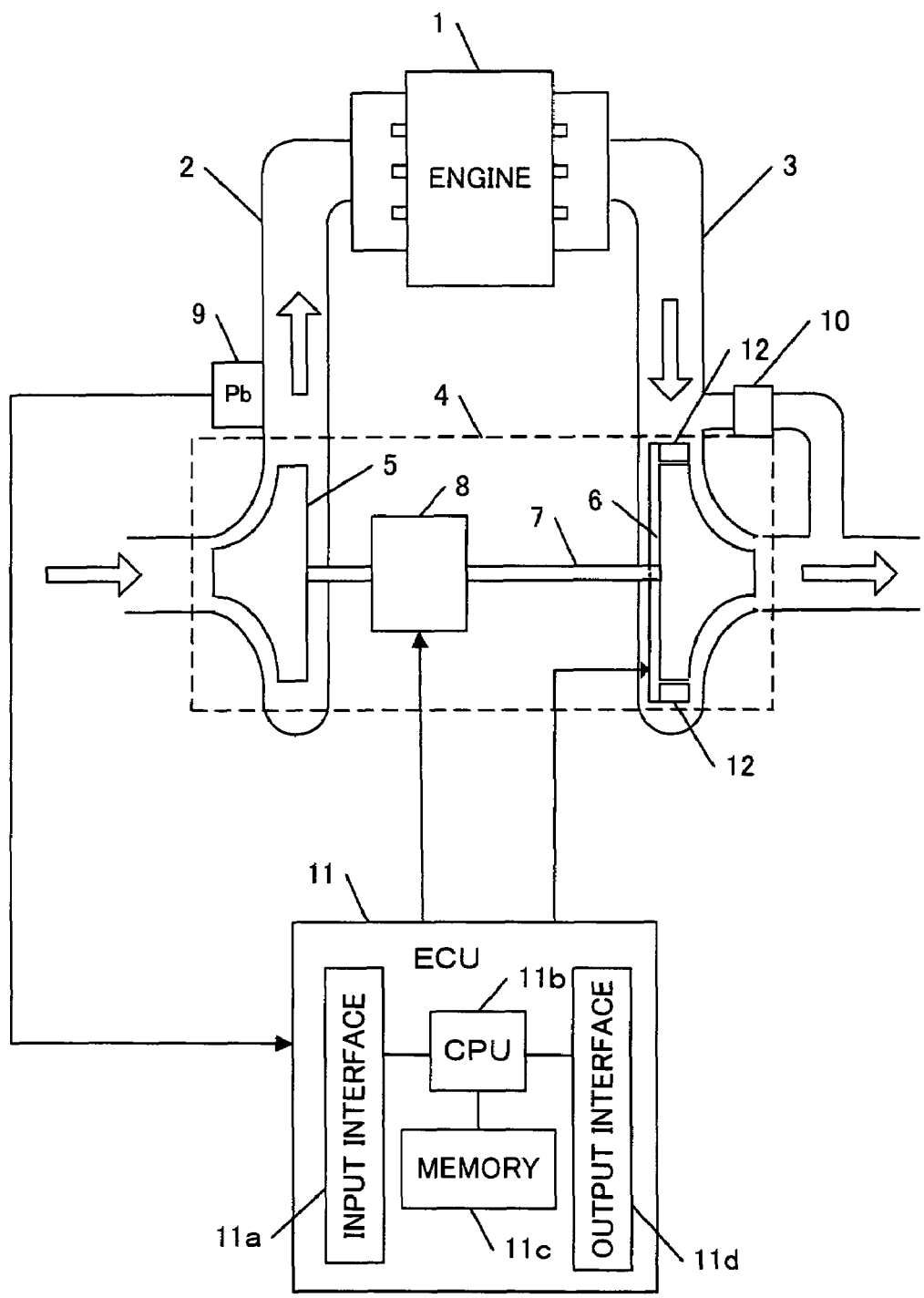
FIG. 1 is a block diagram of an engine system including a turbocharger and a control unit in accordance with a first embodiment of the present invention.

FIG. 1 is a block diagram of an internal combustion engine (which will be hereinafter referred to as an "engine") system including a turbocharger and a control unit in accordance with a first embodiment of the present invention.

An engine 1 is, for example, a diesel engine having four cylinders. An air intake pipe 2 and an exhaust pipe 3 are connected to the engine 1.

A turbocharger 4 includes a compressor 5 disposed in the air intake pipe, a turbine 6 disposed within the exhaust pipe and a rotation shaft 7 connecting the compressor 5 with the turbine 6. The turbine 6 is driven by the energy of exhaust gas. The compressor 5 rotates as the turbine 6 rotates, compressing the intake air.

In this embodiment, the turbocharger is assisted by an electric motor 8 that is additionally provided for providing a driving power to the rotation shaft. Also, the turbocharger 4 includes a variable geometry turbine (hereinafter referred to as "VGT"). When the exhaust gas flow is small, the VGT changes the angle of one or more variable vanes disposed in the outer edge of a turbine wheel to squeeze a passage (nozzle) through which the gas flows into the turbine to enhance the speed of gas glow into the wheel, enhancing acceleration performance of the turbine.

A supercharging pressure sensor 9 is provided downstream of the compressor 5. The sensor 9 detects the pressure of the intake air compressed by the compressor 5. This pressure is referred to as a supercharging pressure.

A flow passage for bypassing the turbine 6 is provided in the exhaust pipe 3. On this passage, a waste gate valve 10 is disposed. When the supercharging pressure is higher than a predetermined value, the waste gate valve is opened to decrease the flow amount of the exhaust gas into the turbine, lowering the supercharging pressure. It should be noted that one of the VGT and the waste gate valve 10 may be provided in an alternative embodiment. Either one has an equivalent function of adjusting the flow amount of the exhaust gas into the turbine 6.

An electronic control unit (hereinafter referred to as an "ECU") 11 includes an input interface 11a for receiving data from various parts of a vehicle, a CPU 11b for performing computations for controlling various parts of the vehicle, a memory 11c including a Read-Only Memory (ROM) and a Random Access Memory (RAM) for temporary storage and an output interface 11d for sending control signals to various parts of the vehicle. The ROM of the memory 11c stores programs and data required for controlling the vehicle. Programs for performing a supercharging pressure control according to the present invention as well as related data and tables used at a run-time of a program are stored in the ROM. The ROM may be a rewritable type of ROM such as an EPROM. The RAM includes a working space to be used by the CPU 11b for computations. The data transmitted from each section of the vehicle and the control signals sent out to various parts of the vehicle are temporarily stored in the RAM.

In this embodiment, the turbine 6 is rotated by the exhaust gas of the engine 1 and the compressor 5 in the air intake pipe is rotated by the rotation shaft 7 connected to the turbine 6. The intake air is compressed by the rotation of the compressor and introduced into the engine. The actual supercharging pressure of such compressed intake air is measured by the supercharging pressure sensor 9 whose output is sent to the input interface 11a of the ECU 11. In the ECU 11, the actual supercharging pressure and the target supercharging pressure are compared. As a result of the comparison, when it is determined that the target supercharging pressure is not achieved with the rotation by the exhaust gas, the ECU 11 provides a control input to the electric motor 8 through the output interface 11d to drive the compressor 5 by the motor to achieve the target supercharging pressure. In parallel with this operation, the ECU 11 provides the turbine 6 with a control signal for controlling the angle of the variable vane 12 in the turbine such that the turbine 6 produces necessary rotation with the current flow amount of the exhaust gas.

Figure 2:
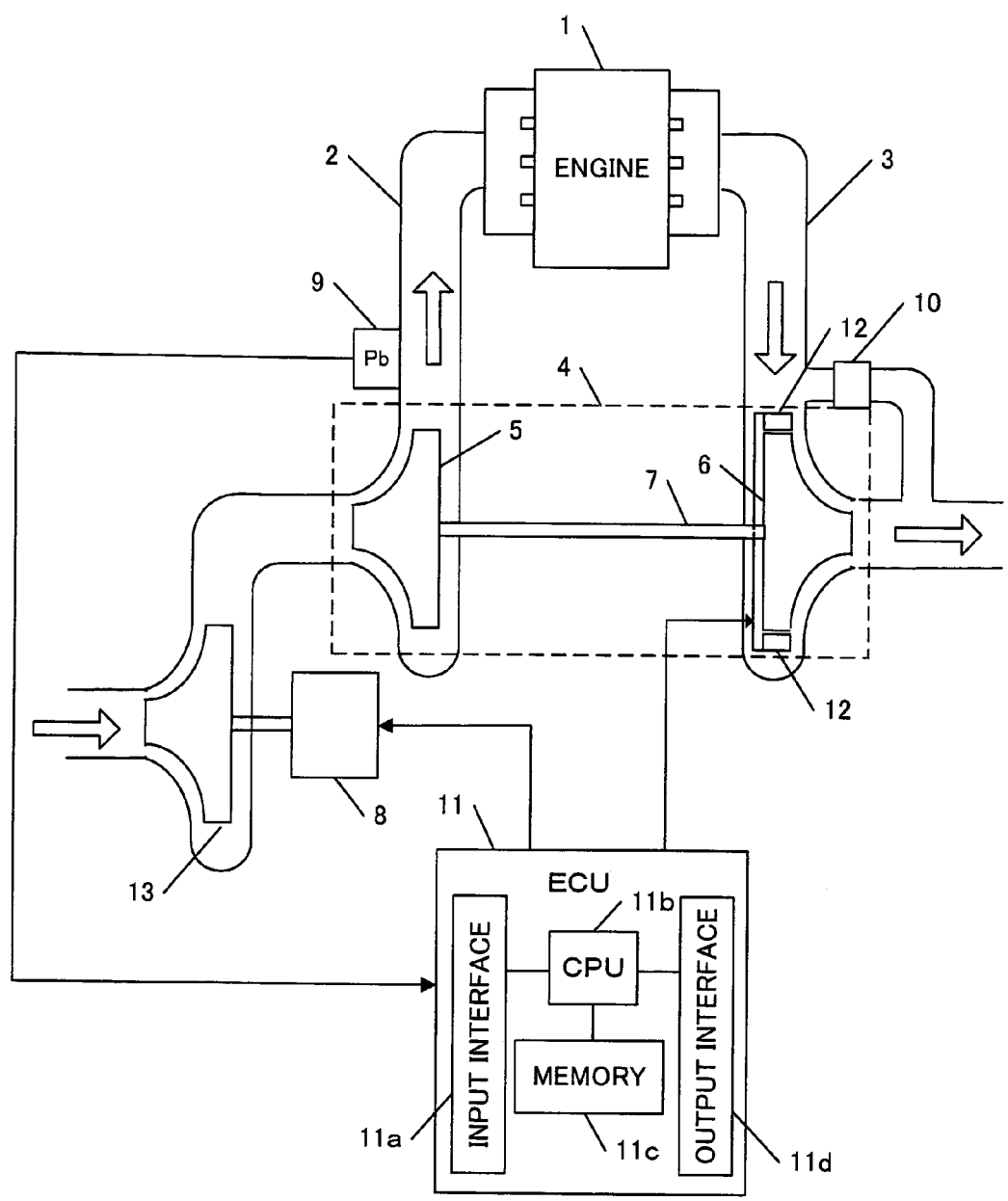
FIG. 2 is a block diagram of an engine system including a turbocharger and a control unit in accordance with a second embodiment of the present invention.

FIG. 2 is a block diagram of an engine, a turbocharger and a control unit in accordance with a second embodiment of the present invention. Since the engine 1, the ECU 11, the supercharging pressure sensor 9 and the waste gate valve 10 are the same as in the embodiment illustrated in FIG. 1, the description thereof is omitted here.

The turbocharger 4 includes a compressor 5 disposed within an air intake pipe 2, a turbine 6 disposed within an exhaust pipe 3 and a rotation shaft 7 connecting compressor 5 with the turbine 6. The turbine 6 is driven by the exhaust gas.

The compressor 5 rotates due to the rotation of the turbine 6, compressing the intake air.

In this embodiment, another compressor 13 driven by an electric-motor 8 is provided in the air intake pipe 2. The electric motor 8 provides a driving force to a rotation shaft of the compressor 13 in accordance with the control value given by the ECU 11. The supercharging pressure can be adjusted by driving the electric-motor compressor 13. Although the electric-motor compressor 13 is provided upstream of the compressor 5 in FIG. 2, it may be disposed downstream of the compressor 5 as long as it is located in the air intake pipe 2.

In this embodiment, the turbine 6 is rotated by the exhaust gas of the engine 1 and the compressor 5 in the air intake pipe is rotated by the rotation shaft 7 connected to the turbine 6. The intake air is compressed by the rotation of the compressor 5 and introduced into the engine 1. The actual supercharging pressure of such compressed intake air is measured by the supercharging pressure sensor 9 and sent to the input interface 11a of the ECU 11. In the ECU 11, the actual supercharging pressure and the target supercharging pressure are compared. When the target supercharging pressure is not achieved with the energy of the exhaust gas, the ECU 11 provides the electric-motor 8 with a control signal for driving the compressor 13 to achieve the target supercharging pressure. In parallel with this operation, the ECU 11 provides the turbine 6 with a control signal for controlling the angle of the variable vane 12 in the turbine such that the turbine 6 can produce a rotation required for the target supercharging pressure with the current flow amount of the exhaust gas.

In the above-described first and second embodiments of the present invention, as a technique for controlling the supercharging pressure, a combination of the technique of using the electric motor (for example, the electric motor 8 or the electric-motor compressor 13) and the technique of using the other mechanism (for example, VGT) than the electric motor may be used. However, the supercharging pressure control technique that does not use the electric motor is not limited to the VGT. For example, as an applicable supercharging pressure control, the opening of the waste valve 10 disposed on the passage for bypassing the turbine within the exhaust pipe 3 can be controlled electrically by the ECU to adjust the flow amount of the exhaust gas into the turbine so as to control the supercharging pressure. Further, in the embodiment, the engine 1 is a diesel engine that has a favorable compatibility with the VGT because the VGT is used as the supercharging pressure control technique. However, the engine 1 may be a gasoline engine if it uses a different supercharging pressure control technique.

In the embodiments of the present invention, the electric motor 8 and the VGT are used for supercharging pressure control. The supercharging pressure control using the electric motor 8 has good responsiveness, but energy consumption may increase. On the other hand, the supercharging pressure control by the VGT is slow in responsiveness, but energy consumption is small. Therefore, in order to maintaining the good response characteristic of the supercharging pressure control while keeping the energy consumption low, it is preferable to use the electric motor 8 having good responsiveness immediately after the change of the target supercharging pressure and then decrease the usage of the electric motor 8 as much as possible and shift majority of the control to the VGT having a characteristic of lower energy consumption.

Figure 3:
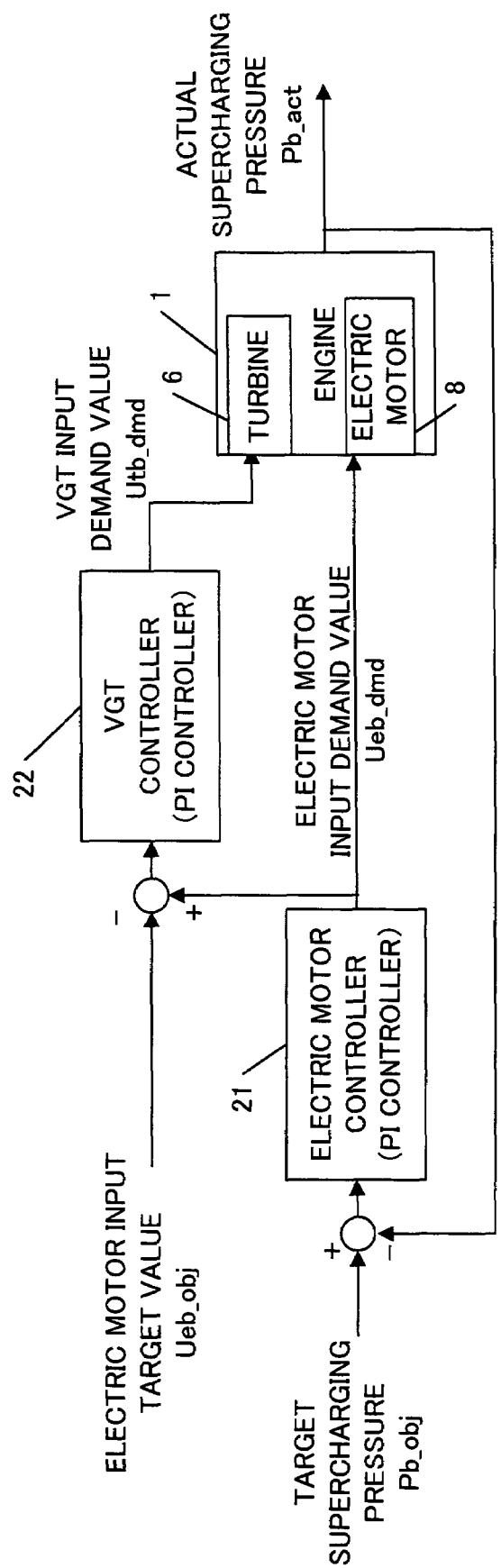
FIG. 3 is a block diagram of a supercharging pressure control apparatus that is used in the first and second embodiments of the present invention.

FIG. 3 is a block diagram of a supercharging pressure control system that is used in the first and second embodiments of the present invention. This control system operates the electric motor 8 and the VGT simultaneously in order to achieve the target supercharging pressure of the engine 1. The system uses a VGT controller 22 to make the control input to the electric motor 8 converge to a target value (this value is zero at a normal operation time). In this manner, the electric motor 8 is used preferentially at the starting time of the supercharging pressure control and as the control goes on, VGT takes over the control.

At first, a target supercharging pressure Pb_obj is determined based on operating conditions of the engine 1. An actual supercharging pressure Pb_act is measured by the supercharging pressure sensor 9. The electric motor controller 21 calculates a motor input demanding value Ueb_dmd based on the difference between the target supercharging pressure Pb_obj and the actual supercharging pressure Pb_act. In this embodiment, this electric motor controller 21 uses a PI controller to calculate the electric motor input demand value Ueb_dmd as in the following equation:

$$Ueb\_dmd = K_{P1} \cdot (Pb_{13}obj - Pb\_act) + K_{I1} \cdot \int (Pb\_obj - Pb\_act)dt$$

where KP1 represents a proportional gain and KI1 represents an integral gain. According to the above equation, the electric motor input demand value Ueb_dmd is established as a large value in proportion to the magnitude of difference between the target supercharging pressure Pb_obj and the actual supercharging pressure Pb_act. Especially, when the target supercharging pressure increases stepwise, the electric motor input demand value Ueb_dmd takes a large value.

The electric motor input demand value is not only a control input to the electric motor 8 but also it is used as an input to the VGT controller 22.

An electric motor input target value Ueb_obj is established in accordance with operating conditions of the engine 1. In this embodiment, this electric motor input target value is set to zero at a normal travel time and it is set to a positive value corresponding to the opening angle of the accelerator at an accelerating time.

The VGT controller 22 calculates a VGT input demand value Utb_dmd based on difference between the electric motor input target value Ueb_obj and the electric motor input demand value Ueb_dmd. In this embodiment, this VGT controller 22 uses a PI controller to calculate the VGT input demand value Utb_dmd as in the following equation:

$$Utb\_dmd = K_{P2} \cdot (Ueb\_dmd - Ueb\_obj) + K_{I2} \cdot \int (Ueb\_dmd - Ueb\_obj)dt$$

where KP2 represents a proportional gain and KI2 represents an integral gain. According to the above equation, the VGT input demand value Utb_dmd is established as a large value proportionally as the electric motor input demand value Ueb_dmd is larger than the electric motor input target value Ueb_obj.

The VGT input demand value Utb_dmd is a control input to the variable vane 12 of the turbine 6 of the turbocharger 4. An increase/decrease of the VGT input demand value corresponds to the angle of the variable vane 12, a nozzle opening. As the VGT input demand value increases, the variable vane 12 rotates toward the direction of narrowing the nozzle. This increases rotations of the turbine. Resultantly, the ratio that the electric motor contributes to rotate the shaft 7 decreases.

Figure 4:
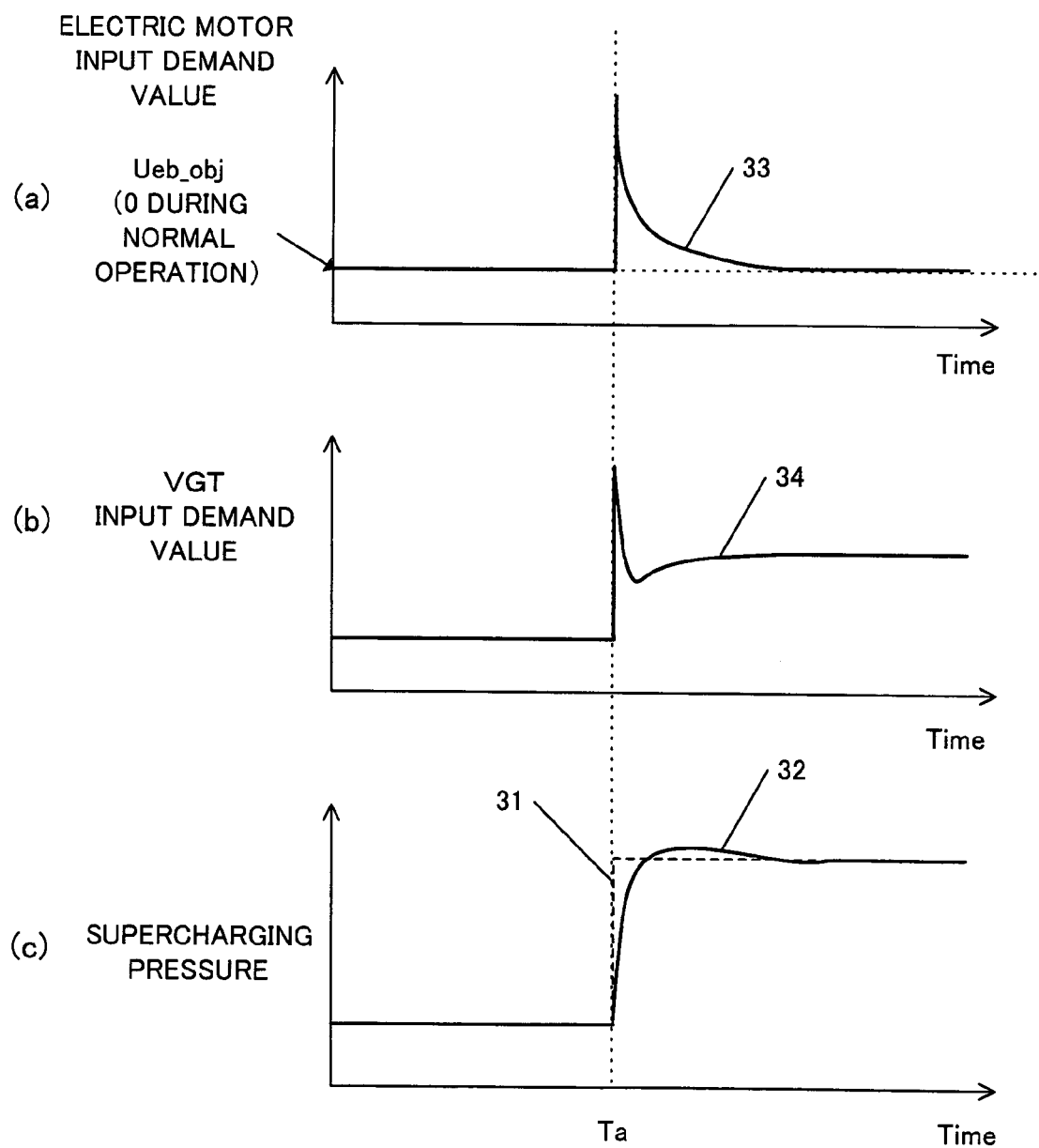
FIG. 4 is a graph showing behaviors of the electric motor input demand value, the VGT input demand value and the actual supercharging pressure when the stepwise target supercharging pressure is input to the first and second embodiments of the present invention.

FIG. 4 graphically illustrates behaviors of the electric motor input demand value Ueb_dmd, the VGT input demand value Utb_dmd and the actual supercharging pressure Pb_act when a stepwise target supercharging pressure Pb_obj 31 is applied in the first and second embodiments of the present invention. In these embodiments, the control inputs to the electric motor and the VGT are represented in terms of duty ratio respectively, and accordingly the vertical axis of FIG. 4(a) and (b) represents the duty ratio.

As the target supercharging pressure 31 rises stepwise at time Ta, electric motor input demand value 33 rises in order to dissolve the difference with the actual supercharging pressure 32. The VGT input demand value 34 also rises in order to dissolve the difference between the electric motor input demand value 33 and the electric motor input target value Ueb_obj.

By the electric motor input demand value 33 and the VGT input demand value 34, the electric motor 8 and the VGT are driven simultaneously immediately after the time Ta. Accordingly, sufficient rotation power can be given to the compressor 5 so that the actual supercharging pressure 32 can quickly follow the target supercharging pressure 31.

As the supercharging pressure becomes stable in a stationary state, the electric motor input demand value 33, which is the control input to the electric motor 8, gradually decreases to converge to the electric motor input target value Ueb_obj and the VGT starts to undertake control the supercharging pressure. Since the input target value Ueb_obj is zero at a normal travel time, the electric motor 8 stops when the demand value 33 converges to the target value Ueb_obj. With respect to the compressor 13 which is not connected to the turbine 6 as shown in FIG. 2, when the electric motor 8 stops, the intake air cannot be introduced into the air intake pipe 2 because the compressor 13 stops. So as to maintain introduction of the intake air, a bypass passage (not illustrated in the drawings) is provided for bypassing the electric motor compressor 13, for example.

On the other hand, the VGT input demand value 34 converges on such value that can maintain the target supercharging pressure. This VGT input demand value corresponds to an angle of the variable vane 12 disposed within the turbine.

Figure 5:
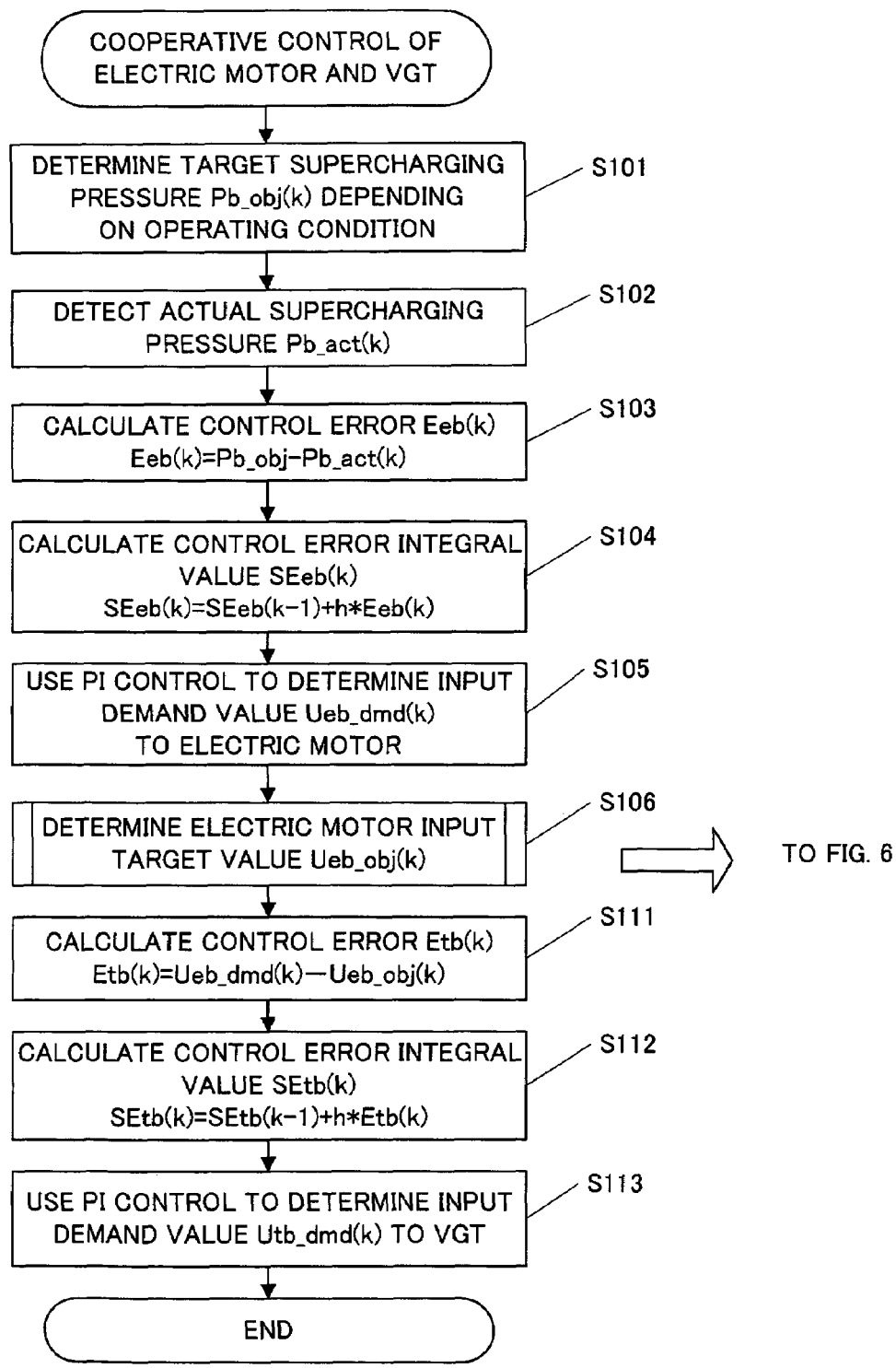
FIG. 5 is a flowchart of a cooperative control of the electric motor and the VGT by the supercharging pressure controller in accordance with the first and second embodiments of the present invention.
Figure 6:
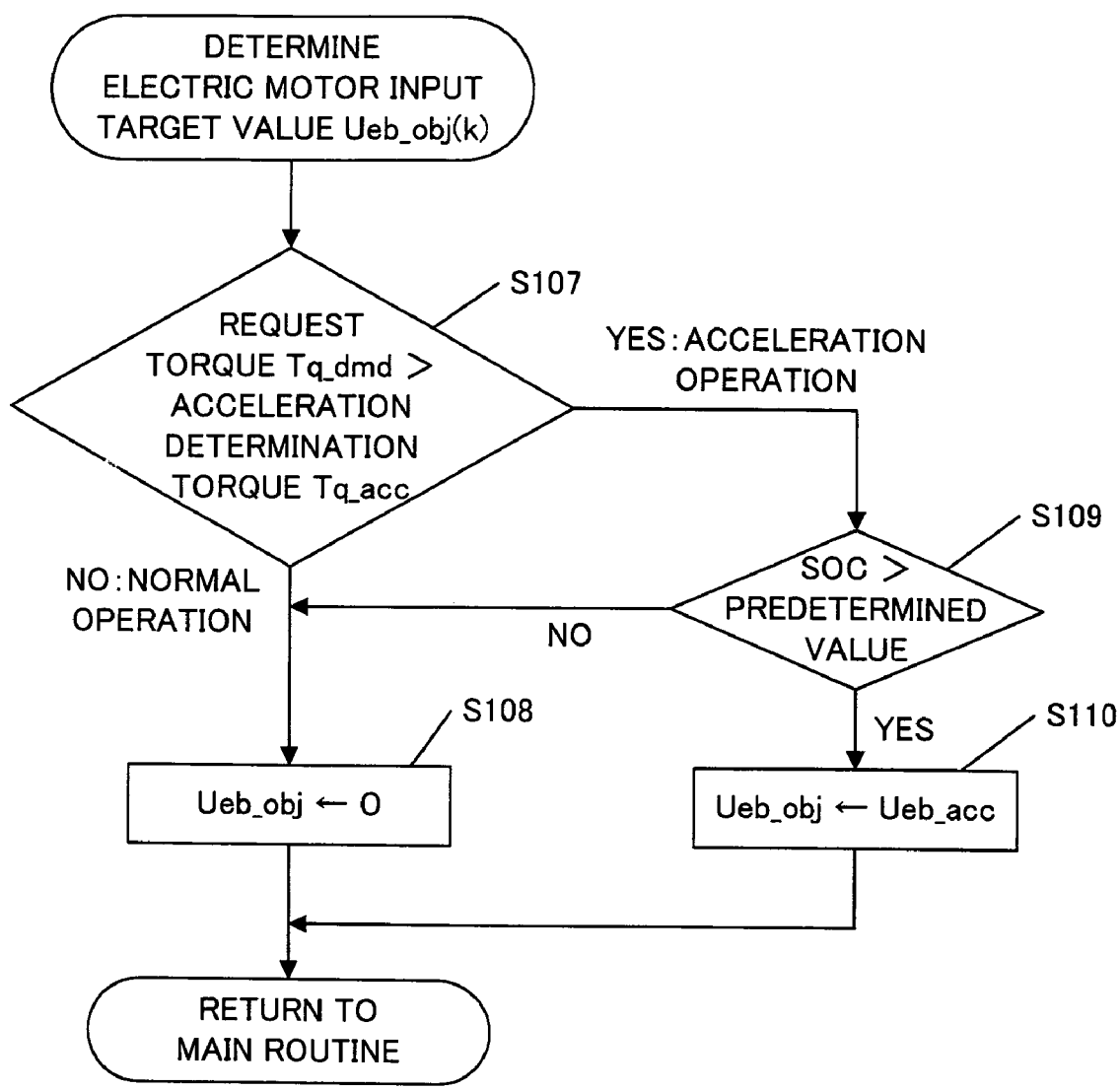
FIG. 6 illustrates a subroutine for determining an electric motor control target value in the flowchart of FIG. 5.

FIG. 5 and FIG. 6 are flowcharts of a cooperative control of the electric motor 8 and the VGT by the supercharging pressure control apparatus in accordance with the first and second embodiments of the present invention. In the chart, the letter k represents the present value, while k−1 represents the preceding value, the value one step before.

In Step 101, the target supercharging pressure Pb_obj(k) is determined based on the operating condition of the concerned vehicle. The target supercharging pressure is determined by searching a map consisting of an engine speed and an engine torque (load) for example.

In Step S102, the actual supercharging pressure Pb_act(k) within the air intake pipe is detected by the supercharging pressure sensor 9.

In Step S103, the actual supercharging pressure is subtracted from the target supercharging pressure to calculate a control error Eeb(k) of the electric motor controller 21 as shown in the following equation:

$$Eeb(k) = Pb\_obj(k) - Pb\_act(k)$$

In Step S104, an integral value SEeb(k) of the control error Eeb(k) is calculated as in the following equation:

$$SEeb(k) = SEeb(k-1) + h*Eeb(k)$$

where the letter h represents a sampling time.

In Step S105, the electric motor input demand value Ueb_dmd(k) is determined by the electric motor controller 21. Since the electric motor controller 21 is a PI controller in this embodiment, the electric motor input demand value Ueb_dmd(k) is calculated as follows:

$$Ueb\_dmd(k) = KP1*Eeb(k) + KI1*SEeb(k)$$

where KP1 represents a proportional gain of the electric motor controller 21 and KI1 represents an integral gain of the electric motor controller 21. This electric motor input demand value Ueb_dmd(k) is not only input to the electric motor 8 within the turbocharger 4 but also it is used as an input to the VGT controller 22.

In Step S106, the electric motor input target value Ueb_obj(k) is determined. The electric motor input target value is determined in accordance with the operating condition of the vehicle as shown in a subroutine of FIG. 6.

In the subroutine for determining the electric motor input target value, in Step S107, a request torque Tq_dmd is at first obtained based on the operating condition of the engine (for example, engine rotational speed) and then this request torque Tq_dmd is compared with a predetermined acceleration determination torque Tq_acc. When the request torque Tq_dmd is smaller than the acceleration determination torque Tq_acc, it is determined that the vehicle is in the normal traveling operation and the process proceeds to Step S108. On the other hand, when the request torque Tq_dmd is larger than the acceleration determination torque Tq_acc, it is determined that the vehicle is in an accelerating operation and the process proceeds to Step S109.

In Step S108, the electric motor input target value Ueb_obj(k) is set to zero and the process returns to the main routine and goes to Step S111.

In Step S109, it is examined whether SOC (state of battery charge) is larger than a predetermined value. When the SOC is larger than the predetermined value, the process proceeds to Step S110, in which the electric motor input target value Ueb_obj (k) is set to a positive value Ueb_acc corresponding to the accelerator opening and then the process returns to the main routine. When the SOC is smaller than the predetermined value, the electric motor input target value Ueb_obj(k) is set to zero in order to reduce the driving power for the electric motor 8 that consumes the energy more so as to suppress the electricity consumption of the battery.

The process returns to the main routine of FIG. 5. In Step S111, the electric motor input target value Ueb_obj(k) that has been determined in the subroutine is subtracted from the electric motor input demand value Ueb_dmd (k) to calculate a control error Etb(k) of the VGT controller 22 as in the following equation:

$$Etb(k) = Ueb\_dmd(k) - Ueb\_obj(k)$$

In Step S112, an integral value SEtb(k) of the control error Etb(k) is calculated as in the following equation:

$$SEtb(k) = SEtb(k-1) + h*Etb(k)$$

where h represents a sampling time.

In Step S113, the VGT input demand value Utb_dmd (k) is determined in the VGT controller 22. Since this VGT controller 22 is a PI controller in this embodiment, the VGT input demand value Utb_dmd(k) is calculated as in the following equation:

$$Utb\_dmd(k) = Kp2*Etb(k) + Ki2*SEtb(k)$$

where Kp2 represents a proportional gain of the controller 22 and Ki2 represents an integral gain of the controller 22. This VGT input demand value Utb_dmd(k) is input to the variable vane 12 within the turbine 6 of the turbocharger 4.

Now, a third embodiment and a fourth embodiment of the present invention will be described.

Figure 7:
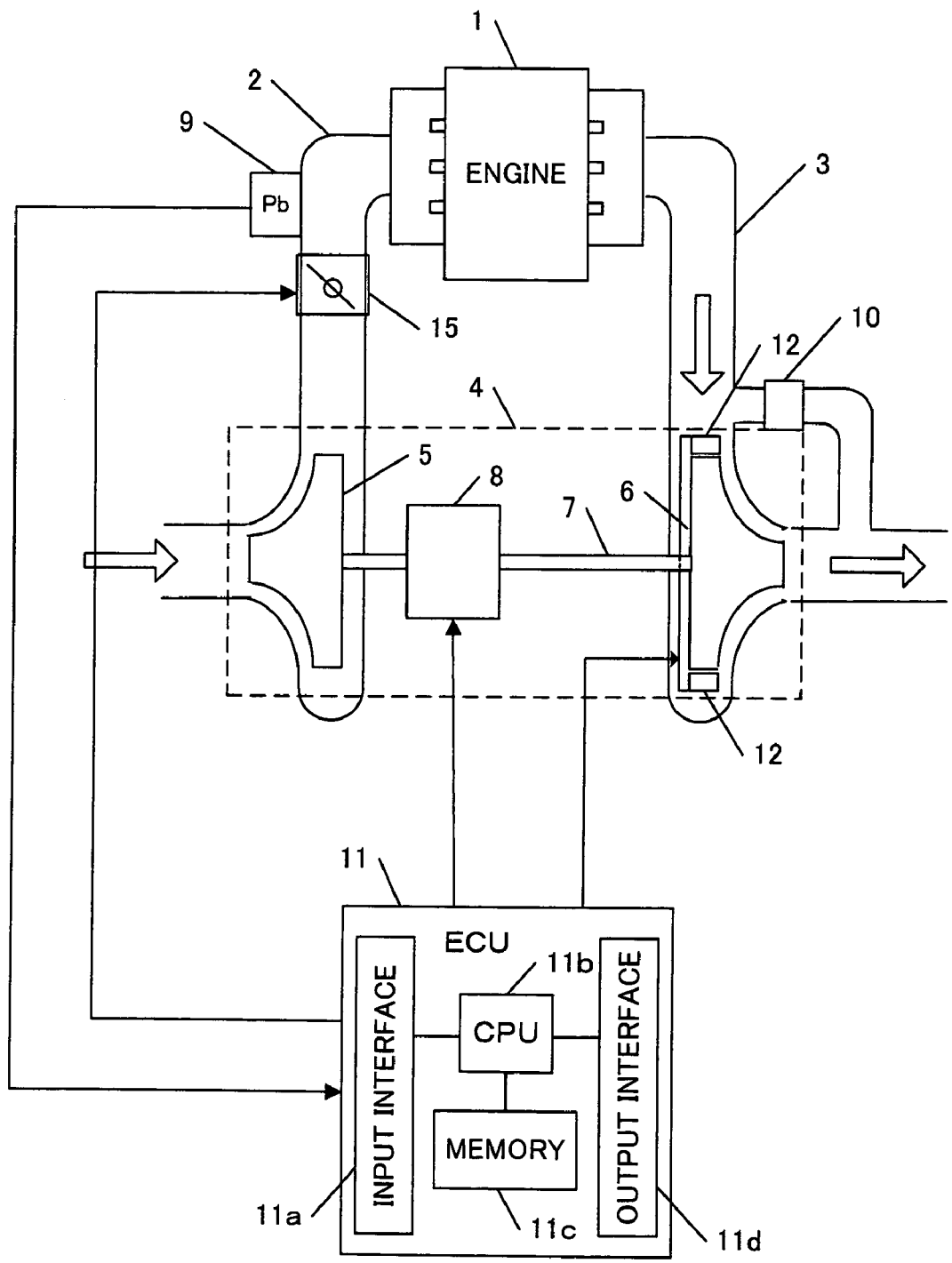
FIG. 7 is a block diagram of an engine, a turbocharger and a control unit in accordance with a third embodiment of the present invention.

FIG. 7 is a block diagram of an engine, a turbocharger and a control unit in accordance with the third embodiment of the present invention. In this embodiment, a throttle valve 15 is added to the structure of the first embodiment. Since the engine 1, the ECU 11, the turbocharger 4, the supercharging pressure sensor 9 and the waste gate valve 10 are same as in the first embodiment, the description thereof is omitted here.

The throttle valve 15 may be disposed anywhere on the downstream side of the compressor 5 but on the upstream side of the supercharging pressure sensor 9 within the air intake pipe 2. In this embodiment, the throttle valve 15 is an electrically-controlled throttle that is driven by an actuator (not illustrated in the drawings) in accordance with a control signal from the ECU 11. The throttle valve 15 is kept at the maximum opening during the normal operation of the engine 1. In a specific application such as a process for regenerating a diesel particulate filter (not illustrated in the drawings) in an exhaust system and so on, the throttle valve is controlled toward the closing direction so as to throttle the intake air.

Figure 8:
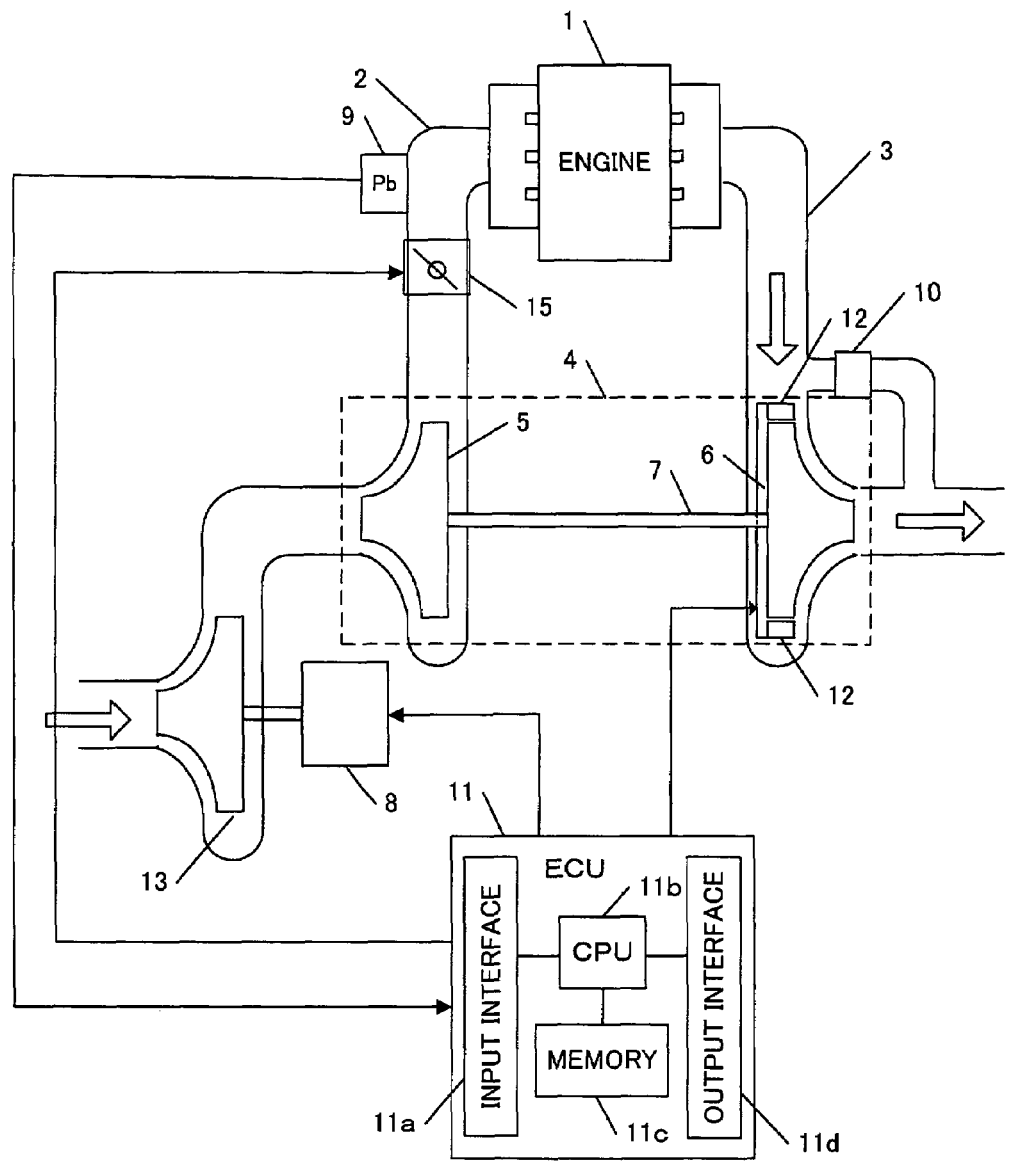
FIG. 8 is a block diagram of an engine system including a turbocharger and a control unit in accordance with a fourth embodiment of the present invention.

FIG. 8 is a block diagram of an engine, a turbocharger and a control unit in accordance with the fourth embodiment of the present invention. In this embodiment, a throttle valve 15 is added to the structure of the second embodiment. Since the engine 1, the ECU 11, the turbocharger 4, the supercharging pressure sensor 9, the waste gate valve 10 and the electric-motor compressor 13 are the same as in the second embodiment and the throttle valve 15 is the same as in the third embodiment, the description thereof is omitted here.

In the third and fourth embodiments of the present invention, the turbine 6 rotates by the exhaust gas of the engine 1 and the compressor 5 in the air intake pipe 2 is driven by the rotation shaft 7 connected to the turbine 6. The intake air is compressed by the rotation of the compressor 5 and introduced into the engine.

The actual supercharging pressure of the compressed intake air is measured by the supercharging pressure sensor 9 and sent to the input interface 11a of the ECU 11. The actual supercharging pressure is compared with the target supercharging pressure in the ECU 11. When the target supercharging pressure cannot be achieved with the rotation of the compressor 5 by the exhaust gas, the ECU 11 sends control signal to the electric motor 8 or the throttle valve 15 in order to achieve the target supercharging pressure.

In parallel with this control operation on the electric motor 8 or the throttle valve 15, the ECU 11 further sends control signal to the turbine 6 through the output interface 11d for controlling the angle of the variable vane 12 in the turbine so that the turbine 6 can rotate to produce the target supercharging pressure with the current flow amount of the exhaust gas.

Thus, in the third and fourth embodiments of the present invention, a high control and a low control are combined for controlling the supercharging pressure. The high control is performed by two or more actuators whose responsiveness is fast and whose energy consumption is large. These actuators including motor 8 and throttle valve 15 are referred to as "high actuators" hereinafter. The low control is performed by one or more actuator whose responsiveness is slow and whose energy consumption is small. These actuators including the VGT are referred to as "low actuators" hereinafter.

It should be noted that the low actuator is not limited to the VGT. For example, supercharging pressure can be controlled by controlling with the ECU the opening of the waste valve 10 disposed on the passage, which bypasses the turbine in the exhaust pipe 3, adjusting the amount of the exhaust gas introduced into the turbine. In this embodiment, the engine 1 is a diesel engine that has a favorable compatibility with the VGT. However, the engine 1 may be a gasoline engine using a different supercharging pressure control technique.

Figure 9:
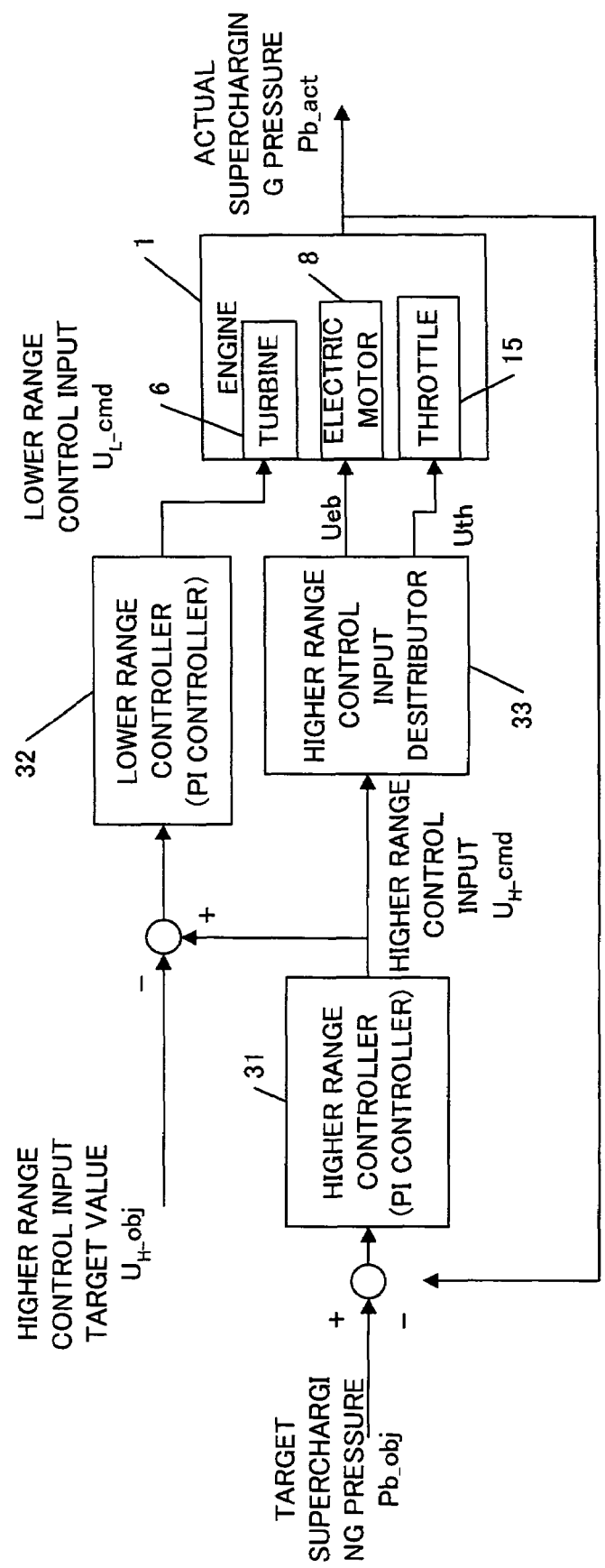
FIG. 9 is a block diagram of a supercharging pressure control apparatus that is used in the third and fourth embodiments of the present invention.

FIG. 9 illustrates a block diagram of a supercharging pressure control apparatus that is used in the third and fourth embodiments of the present invention. This control apparatus achieves the target supercharging pressure Pb_obj of the engine, a controlled object, by driving the high actuators and the low actuators simultaneously in its supercharging pressure control process.

This control apparatus is characterized in that it uses a controller 32 for the low actuators (controller 32 is hereinafter referred to as "low controller") to converge a control input UH_cmd applied to the high actuators into a high control input target value UH_obj (which is zero at the normal travel time). Through such control approach, the high actuators (the electric motor 8 and the throttle valve 15) are preferentially driven initially. As the control input UH_cmd applied to the high actuators converges to the target value UH_obj, the low actuator (the VGT) undertakes main control.

Now, referring to FIG. 9, the supercharging pressure control in accordance with this embodiment will be described. At first, the target supercharging pressure Pb_obj is determined based on the operating condition of the engine 1. Actual supercharging pressure Pb_act is measured by the supercharging pressure sensor 9. Based on the difference between the target supercharging pressure Pb_obj and the actual supercharging pressure Pb_act, a controller 31 for the high actuators (controller 31 is hereinafter referred to as a "high controller") calculates a high control input UH_cmd. The high controller 31 uses a PI controller to calculate the high control input UH_cmd as in the following equation:

$$U_{H\_cmd} = K_{PH}(Pb\_obj - Pb\_act) + K_{IH} \int (Pb\_obj - Pb\_act) dt$$

where KPH represents a proportional gain and KIH represents an integral gain. According to the above equation, the high control input UH_cmd is set such that the high control input UH_cmd rises toward a positive direction proportionally as the target supercharging pressure Pb_obj rises higher than the actual supercharging pressure Pb_act and that the high control input UH_cmd moves toward a negative direction proportionally as the target supercharging pressure Pb_obj falls lower than the actual supercharging pressure Pb_act. In particular, the high control input UH_cmd changes significantly when the target supercharging pressures rises or falls stepwise.

The high control input UH_cmd calculated by the high controller 31 is distributed to the high actuators (the electric motor 8 and the throttle valve 15) through a high control input distributor 33. Based on the high control input UH_cmd, the high control input distributor 33 determines an appropriate control input to each actuator such that each control input may not cause interferences among the actuators.

Figure 10:
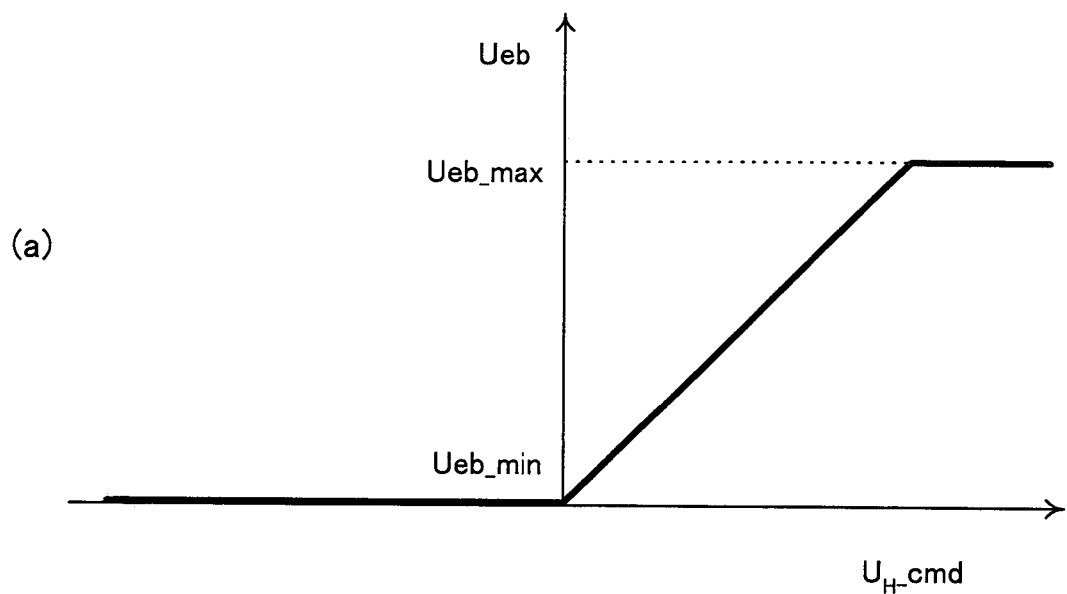
FIG. 10 illustrates a control input distribution table that is provided in a high control input distributor.
Figure 10:
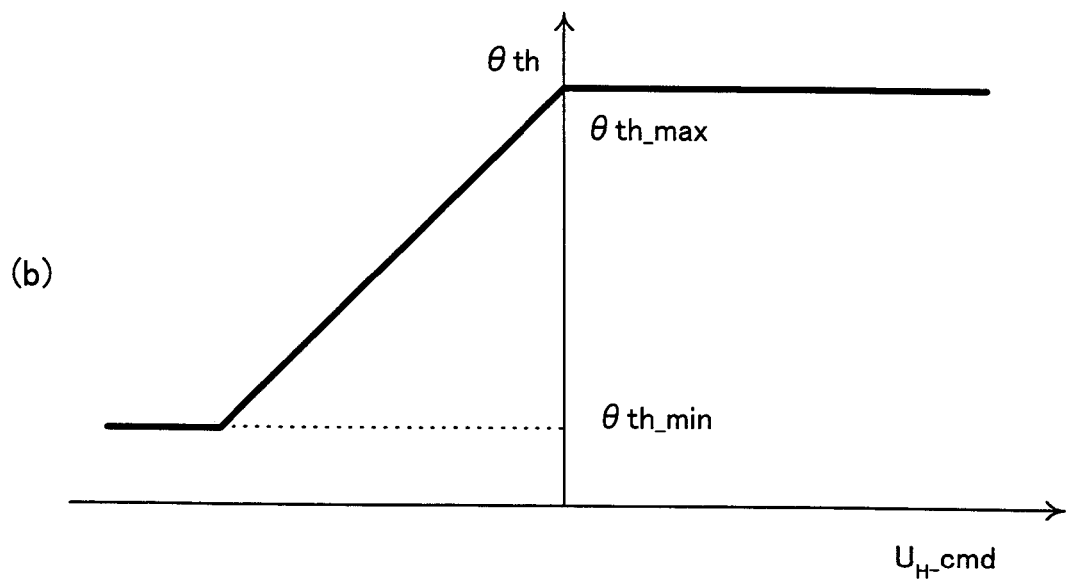

The high control input distributor 33 is provided with a control input distribution table as illustrated in FIG. 10. The distributor 33 refers to this table for determining each control input to the electric motor 8 and the throttle valve 15. In this embodiment, each control input Ueb, Uth to the electric motor 8 and the throttle valve 15 is represented in terms of a duty ratio.

FIG. 10(a) graphically shows a table to be used for determining the control input Ueb of the electric motor 8 for driving the supercharger having the electric motor. The horizontal axis represents the high control input UH_cmd and the vertical axis represents the control input Ueb to the electric motor 8. Since the control input Ueb to the electric motor 8 is a duty ratio in this embodiment, the horizontal axis is represented by the duty ratio, too.

Referring to FIG. 10(a), when the high control input UH_cmd is a positive value, the control input Ueb of the electric motor 8 increases monotonously in accordance with the magnitude of the high control input UH_cmd. Such monotonous increase of the control input Ueb continues until the rotation number of the electric motor 8 reaches a predetermined maximum rotation number Ueb_max (for example, 200,000 rpm) and after that, it keeps a constant at the maximum rotation number Ueb_max. On the other hand, when the high control input UH_cmd is smaller than zero, the control input Ueb of the electric motor 8 becomes a constant at the minimum value Ueb_min. The minimum value Ueb_min of the control input to the electric motor 8 is zero in this embodiment, so that the electric motor 8 stops when the control input is zero. In case of such type of compressor, which is not associated with the turbine 6, as the electric motor compressor 13 shown in FIG. 8, when the electric motor 8 stops, the intake air cannot be introduced into the air intake pipe 2 because the compressor stops its rotation, too. Therefore, the intake air needs to be introduced, for example, by providing a bypass passage (not illustrated in the drawings) for bypassing the electric motor compressor 13.

FIG. 10(*b*) graphically illustrates a table to be used for determining the control input Uth of the throttle valve 15. The horizontal axis of the graph represents the high control input UH_cmd and the vertical axis represents the opening θth of the throttle valve 15.

Referring to FIG. 10(*b*), when the high control input UH_cmd is a negative value, the opening θth of the throttle valve 15 falls monotonously in accordance with the magnitude of the high control input UH_cmd. Such monotonous decrease of the opening θth of the throttle valve 15 continues until the rotational speed of the engine 1 reaches the minimum opening θth_min with which the engine can at least maintain an idling rotational speed, and after that, it keeps a constant at the minimum opening θth_min. On the other hand, when the high control input UH_cmd is smaller than zero, the opening θth of the throttle valve 15 assumes a constant value at the maximum value θth_max.

The control input Uth of the throttle valve 15 is calculated in accordance with the opening θth of the throttle valve. The throttle valve 15 of this embodiment is of a type that it assumes the maximum opening θth_max when the control input is zero. Therefore, when the opening θth of the throttle valve 15 is fully opened (θth_max), the control input Uth is calculated as a value of zero. As the opening θth of the throttle valve 15 moves toward a closing direction, the control input Uth rises.

Thus, in this embodiment, one of the electric motor 8 of the supercharger containing the electric motor and the throttle valve 15 is used selectively in accordance with the plus or minus value of the high control input UH_cmd. When the high control input UH_cmd is a positive value, the supercharger containing the electric motor chiefly controls the supercharging pressure by adjusting the rotation of the compressor. On the other hand, when the high control input UH_cmd is a negative value, the throttle valve 15 chiefly controls the supercharging pressure by adjusting the throttle opening to throttle the intake air. Through such setting, interference between the supercharger containing the electric motor and the throttle valve can be avoided.

Referring again to FIG. 9, the high control input UH_cmd is used not only as a control input for the high actuators but also as an input to the low controller 32.

The high control input target value UH_obj is set in accordance with the operating condition of the engine 1. In this embodiment, the high control input target value UH_obj is zero at the normal travel time. During the accelerating operation, the target value UH_obj takes a positive value corresponding to the accelerator opening.

Based on the difference between the high control input desire value UH_obj and the high control input UH_cmd, the low controller 32 calculates the low control input UL_cmd. In this embodiment, the low controller 32 uses a PI controller to calculate the low control input UL_cmd as in the following equation:

$$U_{L\_cmd} = K_{PL} \cdot (U_{H\_cmd} - U_{H\_obj}) + K_{IL} \cdot \int (U_{H\_cmd} - U_{H\_obj}) dt$$

where KPL represents a proportional gain and KIL represents an integral gain. According to the above equation, the low control input UL_cmd rises toward a positive direction proportionally as the high control input UH_cmd is larger than the high control input target value UH_obj. The low control input UL_cmd falls toward a negative direction proportionally as the high control input UH_cmd is smaller than the high control input target value UH_obj.

In this embodiment, the low control input UL_cmd is a control input to the variable vane 12 in the turbine 6 of the turbocharger 4. An increase/decrease of the low control input UL_cmd corresponds to the angle of the variable vane 12, that is, the nozzle opening. When the low control input UL_cmd rises in the positive direction, the variable vane 12 rotates in the direction of closing the nozzle, so that the rotation of the turbine rises. On the other hand, when the low control input UL_cmd falls in the negative direction, the variable vane 12 rotates in the direction of opening the nozzle, so that the rotation of the turbine falls.

Figure 11:
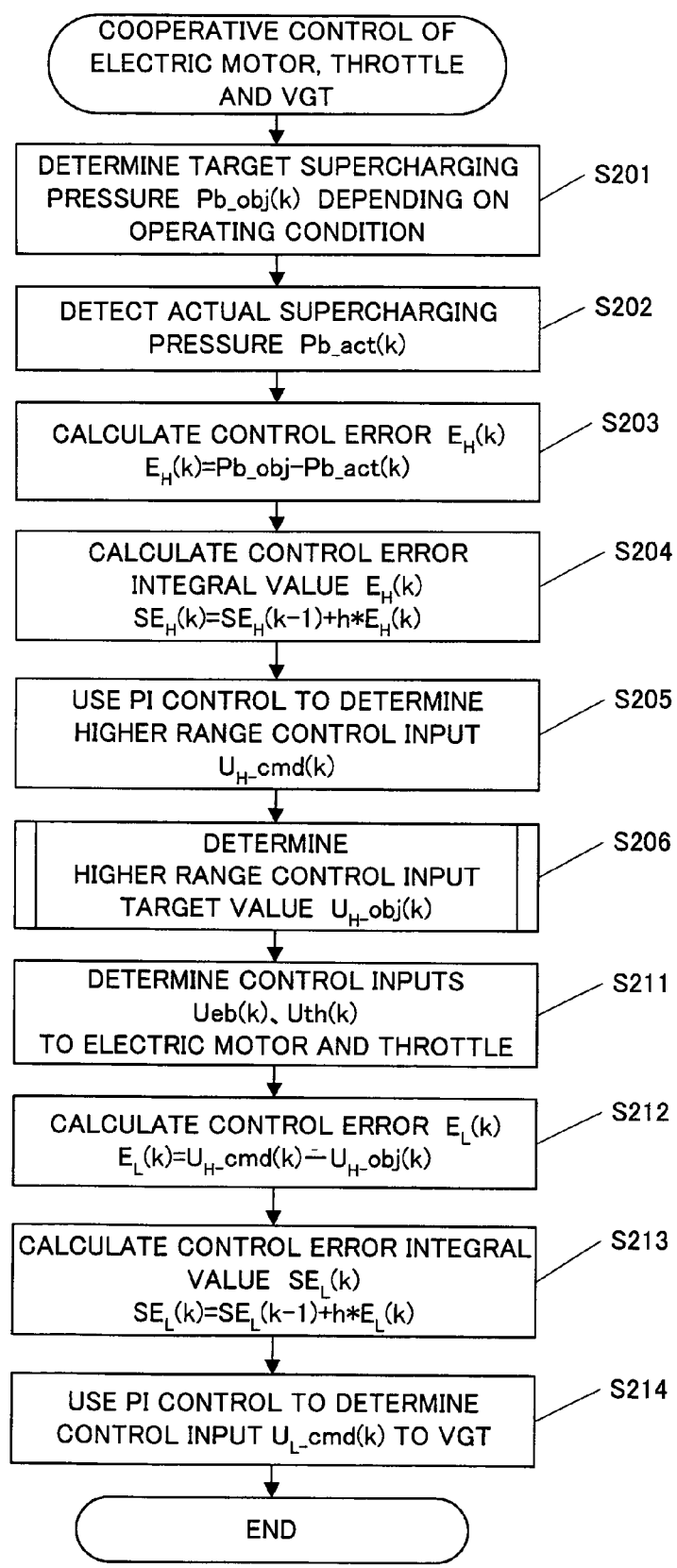
FIG. 11 is a flowchart of a cooperative control of the electric motor and the VGT by the supercharging pressure control apparatus in accordance with third and fourth embodiments of the present invention.
Figure 12:
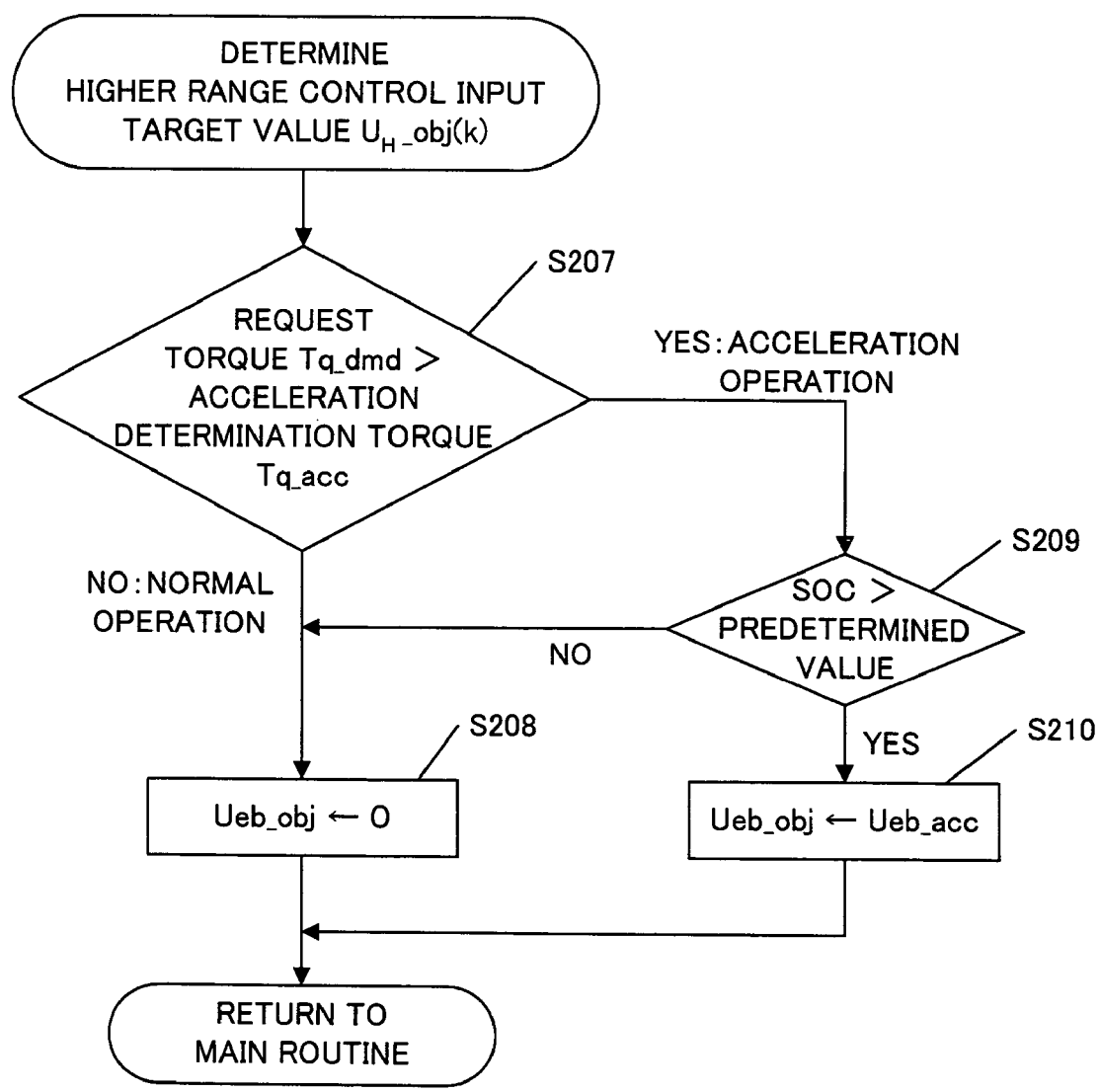
FIG. 12 illustrates a subroutine for determining an electric motor control target value in the flowchart of FIG. 11.

FIG. 11 and FIG. 12 show a flowchart of a cooperative control process of the electric motor 8, the throttle valve 15 and the VGT by the supercharging pressure control apparatus in the third and fourth embodiments of the present invention. The letter k which is used in the following description, represents the current value. k−1 represents the preceding value one step before.

In Step 201, the target supercharging pressure Pb_obj(k) is determined based on the operating condition of the concerned vehicle. The target supercharging pressure is determined by searching a map consisting of an engine speed and an engine torque (load) for example.

In Step S202, the actual supercharging pressure Pb_act(k) in the air intake pipe is detected by the supercharging pressure sensor 9.

In Step S203, the actual supercharging pressure is subtracted from the target supercharging pressure to calculate a control error EH(k) of the high controller 31 as shown in the following equation:

$$EH(k) = Pb\_obj(k) - Pb\_act(k)$$

In Step S204, an integral value SEH(k) of the control error EH(k) is calculated as in the following equation:

$$SEH(k) = SEH(k-1) + h \cdot EH(k)$$

where h represents a sampling time.

In Step S205, the high control input UH_cmd(k) is determined by the high controller 31. Since the high controller 31 is a PI controller in this embodiment, the high control input UH_cmd(k) is calculated as in the following equation:

$$UH\_cmd(k) = KPH \cdot Eeb(k) + KIH \cdot SEeb(k)$$

where KPH represents a proportional gain of the high controller 31 and KIH represents an integral gain of the high controller 31. This high control input UH_cmd (k) is used not only as a control input to the electric motor 8 and the throttle valve 15 in the turbocharger 4 but also as an input to the low controller 32.

In Step S206, the high control input target value UH_obj(k) is determined.

In the subroutine for determining the electric motor input target value, in Step S207, a request torque Tq_dmd is at first obtained based on the operating condition of the engine (for example, engine rotational speed) and then this request torque Tq_dmd is compared with a predetermined acceleration determination torque Tq_acc. When the request torque Tq_dmd is smaller than the acceleration determination torque Tq_acc, the vehicle is determined to be in the normal travel and the process proceeds to Step S208. On the other hand, when the request torque Tq_dmd is larger than the acceleration determination torque Tq_acc, the vehicle is determined to be in the accelerating operation and the process proceeds to Step S209.

In Step S208, the high control input target value UH_obj(k) is set to zero and the process returns to the main routine and goes to Step S211.

In Step S209, it is examined whether SOC (state of battery charge) is larger than a predetermined value. When the SOC is larger than the predetermined value, the process proceeds to Step S210, in which the high control input target value UH_obj(k) is set to a positive value UH_acc corresponding to the accelerator opening and then the process returns to the main routine. When the SOC is smaller than the predetermined value, the high control input target value UH_obj(k) is set to zero in order to reduce the driving power for the electric motor consuming the more energy to suppress the electricity consumption of the battery.

The process returns to the main routine of FIG. 11. In Step S211, the control input Ueb(k) of the electric motor 8 and the control input Uth(k) of the throttle valve 15 are determined in accordance with the high control input UH_cmd(k) by the high control input distributor 33. The high control input distributor 33 is provided with such control input distribution table as shown in FIG. 10. The distributor 33 refers to this table to determine each control input to the electric motor 8 and the throttle valve 15 in accordance with the high control input UH_cmd(k).

In Step S212, the high control input target value UH_obj(k) determined in the subroutine is subtracted from the high control input UH_cmd (k) to calculate a control error EL(k) of the low controller 32 as in the following equation:

$$EL(k)=UH\_cmd(k)-UH\_obj(k)$$

In Step S213, an integral value SEL(k) of the control error EL(k) is calculated as in the following equation:

$$SEL(k)=SEL(k-1)+h*EL(k)$$

where h represents a sampling time.

In Step S214, the low control input UL_cmd(k) is determined by the low controller 32. Since the low controller 32 is a PI controller in this embodiment, the low control input UL_cmd(k) is calculated as in the following equation:

$$UL\_cmd(k)=KPL*Etb(k)+KIL*SEtb(k)$$

where KPL represents a proportional gain of the low controller 32 and KIL represents an integral gain of the low controller 32. This low control input UL_cmd(k) is input to the variable vane 12 within the turbine 6 of the turbocharger 4.

What is claimed is:

1. A method for controlling an internal combustion engine system with a supercharger having a compressor system provided in an intake pipe and at least partially powered by an electric motor for compressing intake air, a motor controller for controlling the electric motor, a turbine system provided in an exhaust pipe and connected to the compressor for driving the compressor system, said turbine system comprising a turbine and means for adjusting rotation of the turbine, a detector for detecting supercharging pressure downstream of said compressor system, the method comprising the steps of;
   determining a target supercharging pressure based on the operational conditions of the engine;
   calculating a first control demand value provided to the motor controller thereby driving the compressor system so that the supercharging pressure detected by the detector approaches the target supercharging pressure;
   determining a target value of the first control demand value based on operational conditions of the engine; and
   calculating a second control demand value provided to the turbine system thereby adjusting rotation of the turbine so that the first control demand value converges to the target value.

2. The method as claimed in claim 1, wherein in a normal operation, the target value is set to zero.

3. The method as claimed in claim 1, wherein in an accelerating operation, the target value is set to a predetermined value.

4. The method as claimed in claim 1, further comprising the step of deactivating the electric motor when battery charge is smaller than a predetermined value.

5. The method as claimed in claim 1, further comprising the step of adjusting rotation of the turbine by bypassing exhaust gas through a waste gate valve.

6. The method as claimed in claim 1, wherein the engine system includes a throttle valve provided in the intake pipe and positioned downstream of the compressor system; the method further comprising the steps of:
   when the actual supercharging pressure is lower than the target supercharging pressure, raising said first control demand value in proportion to the difference between the actual supercharging pressure and the target supercharging pressure, thereby raising the actual supercharging pressure; and
   when the actual supercharging pressure is higher than the target supercharging pressure, changing the opening angle of the throttle valve toward a closing direction in proportion to said difference, thereby lowering the actual supercharging pressure.

7. The method as claimed in claim 1, wherein the engine system includes a throttle valve provided in the intake pipe and positioned downstream of the compressor system, the method further comprising the steps of:
   when the actual supercharging pressure is lower than the target supercharging pressure, raising said first control demand value in proportion to the difference between the actual supercharging pressure and the target supercharging pressure and moving the throttle valve to a full open angle, thereby raising the actual supercharging pressure; and
   when the actual supercharging pressure is higher than the target supercharging pressure, changing the opening angle of the throttle valve toward a closing direction in proportion to said difference and setting said first control demand value to a predetermined minimum value, thereby lowering the actual supercharging pressure.

8. A computer executable program stored in a computer readable medium for controlling an internal combustion engine system with a supercharger having a compressor system provided in an intake pipe and at least partially powered by an electric motor for compressing intake air, a motor controller for controlling the electric motor, a turbine system provided in an exhaust pipe and connected to the compressor for driving the compressor system, said turbine system comprising a turbine and means for adjusting rotation of the turbine, a detector for detecting supercharging pressure downstream of said compressor system, the program when executed performing:
   determining a target supercharging pressure based on the operational conditions of the engine;
   calculating a first control demand value provided to the motor controller thereby driving the compressor system so that the supercharging pressure detected by the detector approaches the target supercharging pressure;
   determining a target value of the first control demand value based on operational conditions of the engine; and
   calculating a second control demand value provided to the turbine system thereby adjusting rotation of the turbine so that the first control demand value converges to the target value.

9. The program as claimed in claim 8, wherein for a normal operation of the engine, the target value is set to zero.

10. The program as claimed in claim 8, wherein for an accelerating operation of the engine, the target value is set to a predetermined value.

11. The program as claimed in claim 8, further performing deactivating the electric motor when battery charge is smaller than a predetermined value.

12. The program as claimed in claim 8, further performing adjusting rotation of the turbine by bypassing exhaust gas through a waste gate valve.

13. The program as claimed in claim 8, wherein the engine system includes a throttle valve provided in the intake pipe and positioned downstream of the compressor system, the program further performing:
- if the actual supercharging pressure is lower than the target supercharging pressure, raising said first control demand value in proportion to the difference between the actual supercharging pressure and the target supercharging pressure, thereby raising the actual supercharging pressure; and
- if the actual supercharging pressure is higher than the target supercharging pressure, changing the opening angle of the throttle valve toward a closing direction in proportion to said difference, thereby lowering the actual supercharging pressure.

14. The program as claimed in claim 8, wherein the engine system includes a throttle valve provided in the intake pipe and positioned downstream of the compressor system, the program further performing:
- if the actual supercharging pressure is lower than the target supercharging pressure, raising said first control demand value in proportion to the difference between the actual supercharging pressure and the target supercharging pressure and moving the throttle valve to a full open angle, thereby raising the actual supercharging pressure; and
- if the actual supercharging pressure is higher than the target supercharging pressure, changing the opening angle of the throttle valve toward a closing direction in proportion to said difference and setting said first control demand value to a predetermined minimum value, thereby lowering the actual supercharging pressure.

15. An internal combustion engine system with a supercharger, the system comprising:
- a compressor system provided in an intake pipe and at least partially powered by an electric motor for compressing intake air;
- a motor controller for controlling the electric motor;
- a turbine system provided in an exhaust pipe and connected to the compressor for driving the compressor system, said turbine system comprising a turbine and means for adjusting rotation of the turbine;
- a detector for detecting supercharging pressure downstream of said compressor system;
- means for determining a target supercharging pressure based on the operational conditions of the engine;
- means for calculating a first control demand value provided to the motor controller thereby driving the compressor system so that the supercharging pressure detected by the detector approaches the target supercharging pressure;
- means for determining a target value of the first control demand value based on operational conditions of the engine; and
- means for calculating a second control demand value provided to the turbine system thereby adjusting rotation of the turbine so that the first control demand value converges to the target value.

16. The engine system as claimed in claim 15, wherein in a normal operation, the target value is set to zero.

17. The engine system as claimed in claim 15, wherein in an accelerating operation, the target value is set to a predetermined value.

18. The engine system as claimed in claim 15, further comprising a battery for driving the electric motor, wherein the electric motor is deactivated when the battery charge is smaller than a predetermined value.

19. The engine system as claimed in claim 15, wherein the compressor system comprises a compressor connected to said turbine with a rotary shaft driven by the turbine, said electric motor being connected to the rotary shaft for driving the shaft.

20. The engine as claimed in claim 15, wherein the compressor system comprises a first compressor connected to said turbine to be driven by the turbine and a second compressor provided in said intake pipe, said second compressor driven by said electric motor.

21. The engine as claimed in claim 15, wherein the turbine system comprises a variable geometry turbine.

22. The engine as claimed in claim 15, wherein said means for adjusting rotation of the turbine comprises a waste gate valve for bypassing exhaust gas.

23. The engine as claimed in claim 15, further comprising a throttle valve provided in the intake pipe and positioned downstream of the compressor system;
- wherein when the actual supercharging pressure is lower than the target supercharging pressure, said first control demand value is raised in proportion to the difference between the actual supercharging pressure and the target supercharging pressure to raise the actual supercharging pressure; and
- wherein when the actual supercharging pressure is higher than the target supercharging pressure, the opening angle of the throttle valve is changed toward a closing direction in proportion to said difference to lower the actual supercharging pressure.

24. The engine as claimed in claim 1, further comprising a throttle valve provided in the intake pipe and positioned downstream of the compressor system;
- wherein when the actual supercharging pressure is lower than the target supercharging pressure, said first control demand value is raised in proportion to the difference between the actual supercharging pressure and the target supercharging pressure to raise the actual supercharging pressure and the opening angle of the throttle valve is moved to a full open angle to raise the actual supercharging pressure; and
- wherein when the actual supercharging pressure is higher than the target supercharging pressure, the opening angle of the throttle valve is change toward a closing direction in proportion to said difference and said first control demand value is set to a predetermined minimum value to lower the actual supercharging pressure.

* * * * *